US012508978B2

United States Patent
Holmstrom et al.

(10) Patent No.: US 12,508,978 B2
(45) Date of Patent: Dec. 30, 2025

(54) TRUCK BED DIVIDERS WITH RETRACTABLE DIVIDER EXTENSIONS

(71) Applicant: Toyota Motor Engineering & Manufacturing North America, Inc., Plano, TX (US)

(72) Inventors: Adam D. Holmstrom, Pinckney, MI (US); Paxton S. Williams, Milan, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 384 days.

(21) Appl. No.: 18/108,226

(22) Filed: Feb. 10, 2023

(65) Prior Publication Data
US 2024/0270150 A1    Aug. 15, 2024

(51) Int. Cl.
*B60P 7/08*    (2006.01)
*B60P 7/14*    (2006.01)

(52) U.S. Cl.
CPC .................................. *B60P 7/14* (2013.01)

(58) Field of Classification Search
CPC ............ B60P 7/14; B60P 7/0892; B60P 7/135
USPC .......... 410/94, 118, 121, 129–135, 137–142, 410/150; 296/24.4
See application file for complete search history.

(56) References Cited

U.S. PATENT DOCUMENTS

| | | | |
|---|---|---|---|
| 4,278,376 A * | 7/1981 | Hunter | B60P 7/14 410/130 |
| 5,411,355 A * | 5/1995 | Gosnell | B60P 7/14 410/139 |
| 5,427,486 A | 6/1995 | Green | |
| 5,586,850 A | 12/1996 | Johnson | |
| 7,175,218 B1 | 2/2007 | Keene | |
| 7,195,432 B2 | 3/2007 | Earle et al. | |
| 8,371,782 B2 | 2/2013 | Hill | |
| 11,938,904 B2 * | 3/2024 | Bernal | B60R 9/06 |
| 2005/0152761 A1 * | 7/2005 | Silamianos | B60P 7/14 410/130 |
| 2015/0063938 A1 * | 3/2015 | Peters | B60P 7/14 410/129 |

* cited by examiner

*Primary Examiner* — Stephen T Gordon
(74) *Attorney, Agent, or Firm* — Dinsmore & Shohl LLP

(57) ABSTRACT

A truck includes a passenger cabin and a truck bed located rearward of the passenger cabin in a vehicle longitudinal direction. The truck bed includes a bed deck, a first sidewall, a second sidewall, a first wheel well adjacent the first sidewall and a second wheel well adjacent the second sidewall. A bed divider extends in a vehicle lateral direction. The bed divider includes a main body that has a wheel well opening that is sized and arranged to receive the first wheel well therethrough. A divider extension is moveable relative to the main body and covers the wheel well opening in an extended configuration. The divider extension includes a projection that rides along a guide that extends along the first sidewall and over the first wheel well of the truck bed in order to move the divider extension between the extended configuration and a retracted configuration providing increased clearance for the first wheel well relative to the extended configuration as the bed divider is moved in the vehicle longitudinal direction along the truck bed.

14 Claims, 3 Drawing Sheets

TRUCK BED DIVIDERS WITH RETRACTABLE DIVIDER EXTENSIONS

TECHNICAL FIELD

The present specification generally relates to trucks and, more specifically, to trucks with truck beds including truck bed dividers.

BACKGROUND

Vehicles often have storage areas where cargo is stowed. An example is a pickup truck with a truck bed. The truck bed provides a volume for storing cargo. Some cargo may have a tendency to move within the volume, particularly when the tuck moves. It may be desirable to limit the movement of the cargo by reducing the amount of space of the truck bed. Bed dividers have been proposed that can be placed within the truck beds. However, the wheel wells located in the truck beds may limit where the bed dividers can be placed. Further, repositioning of the bed dividers may be cumbersome due to the presence of the wheel wells.

SUMMARY

In accordance with one embodiment, a truck includes a passenger cabin and a truck bed located rearward of the passenger cabin in a vehicle longitudinal direction. The truck bed includes a bed deck, a first sidewall, a second sidewall, a first wheel well adjacent the first sidewall and a second wheel well adjacent the second sidewall. A bed divider extends in a vehicle lateral direction. The bed divider includes a main body that has a wheel well opening that is sized and arranged to receive the first wheel well therethrough. A divider extension is moveable relative to the main body and covers the wheel well opening in an extended configuration. The divider extension includes a projection that rides along a guide that extends along the first sidewall and over the first wheel well of the truck bed in order to move the divider extension between the extended configuration and a retracted configuration providing increased clearance for the first wheel well relative to the extended configuration as the bed divider is moved in the vehicle longitudinal direction along the truck bed.

In accordance with another embodiment, a bed divider system for a truck bed includes a bed divider. The bed divider includes a main body that has a wheel well opening that is sized and arranged to receive a wheel well therethrough. A divider extension is moveable relative to the main body and covers the wheel well opening in an extended configuration. The divider extension includes a projection arranged and configured to be received by a guide channel. A guide is configured to extend along a first sidewall of the truck bed and over the wheel well in order to move the divider extension between the extended configuration and a retracted configuration providing increased clearance for the wheel well relative to the extended configuration as the bed divider is moved in a vehicle longitudinal direction along the truck bed.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Trucks according to the present specification include a passenger cabin and a truck bed located rearward of the passenger cabin in a vehicle longitudinal direction. The truck bed includes a bed deck, a first sidewall, a second sidewall, a first wheel well adjacent the first sidewall and a second wheel well adjacent the second sidewall. A bed divider extends in a vehicle lateral direction and includes a main body that has wheel well openings that are sized and arranged to receive the first and second wheel wells therethrough. Divider extensions are moveable relative to the main body and cover the wheel well openings in an extended configuration. The divider extensions each include a projection that is received by respective guide channels that extend along the first and second sidewalls and over the first and second wheel wells of the truck bed in order to move the divider extensions between the extended configuration and a retracted configuration providing increased clearance for the first and second wheel wells relative to the extended configuration as the bed divider is moved in the vehicle longitudinal direction along the truck bed.

Figure 1:
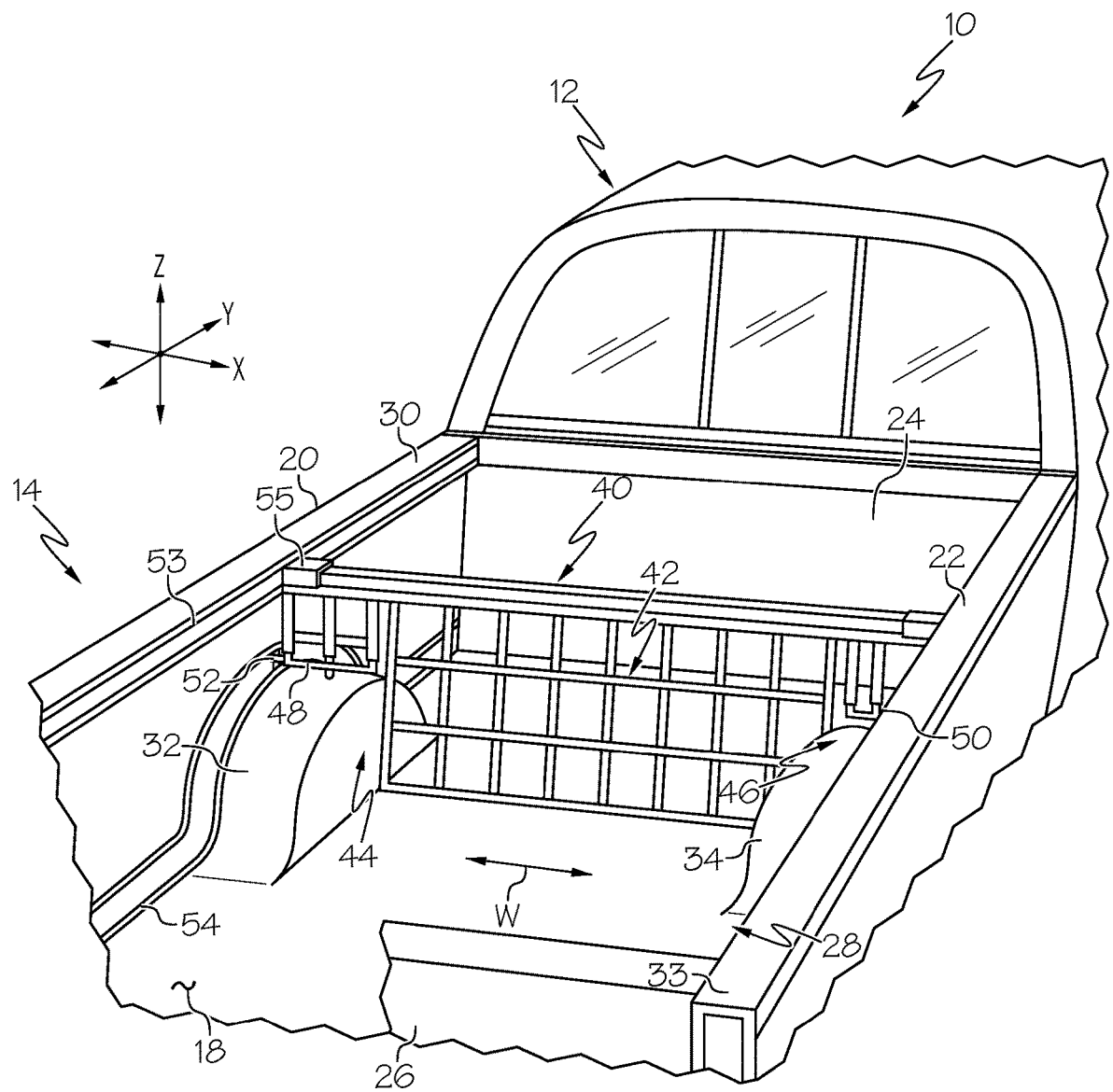
FIG. 1 diagrammatically depicts a perspective rear view of a pickup truck including a truck bed with a bed divider that divides the truck bed into sections, according to one or more embodiments shown and described herein.

As used herein, the term "vehicle longitudinal direction" refers to the forward-rearward direction of the pickup truck (i.e., in the +/− vehicle Y direction depicted in FIG. 1). The term "vehicle lateral direction" refers to the cross-pickup truck direction (i.e., in the +/− vehicle X direction depicted in FIG. 1), and is transverse to the vehicle longitudinal direction. The term "vehicle vertical direction" refers to the upward-downward direction of the pickup truck (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring to FIG. 1, the terms "outboard" or "outward" as used herein refers to the relative location of a component in a direction with respect to a pickup truck centerline. The term "inboard" or "inward" as used herein refers to the relative location of a component in a direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline when evaluating components positioned along opposite sides of the pickup truck 10.

A pickup truck is generally illustrated at 10. The pickup truck 10 includes a passenger cabin 12 and a truck bed 14. The truck bed 14 includes a bed deck 18, a pair of spaced apart sidewalls 20, 22, a front wall 24, and a tailgate 26. The bed deck 18, the sidewalls 20, 22, the front wall 24, and the tailgate 26 define a storage area 28 of the truck bed 14.

The sidewalls 20, 22 extend parallel to the vehicle longitudinal direction. Each sidewall 20, 22 includes a front end 30 and an opposite rear end 33. The front wall 24 extends between the front ends 30 of the sidewalls 20, 22. The tailgate 26 extends between the rear ends 33 of the sidewalls 20, 22.

The tailgate 26 is pivotally connected to the sidewalls 20, 22 for movement between a closed position and an open position. In the closed position, the tailgate 26 extends parallel to the vehicle vertical direction. In the closed position, the tailgate 26 extends parallel to the vehicle vertical direction. In the open position, the tailgate 26 extends parallel to the vehicle longitudinal direction.

Wheel wells 32 and 34 are located in the storage area 28 of the truck bed 14. The wheel wells 32 and 34 are the enclosures that house the rear wheels of the truck 10. As can be seen, the wheel wells 32 and 34 extend inward from the sidewalls 20 and 22 and also vertically from the bed deck 18. In this regard, the wheel wells 32 and 34 take up space within the storage area 28. The wheel wells 32 also change the footprint of the bed deck 18 by reducing a width W of the bed deck 18 between the wheel wells 32 and 34.

A bed divider 40 extends in the vehicle lateral direction and includes a main body 42. Located outboard of the main body 42 are wheel well openings 44 and 46 that are sized and arranged to receive the wheel wells 32 and 34 therethrough. Divider extensions 48 and 50 are slidably attached to the main body 42. The divider extensions 48 and 50 are moveable relative to the main body 42 to cover and expose the wheel well openings 44 and 46. The divider extensions 48 and 50 are moveable between a retracted configuration exposing the wheel well openings 44 and 46, as shown, and an extended configuration covering the wheel well openings 44 and 46.

Figure 2:
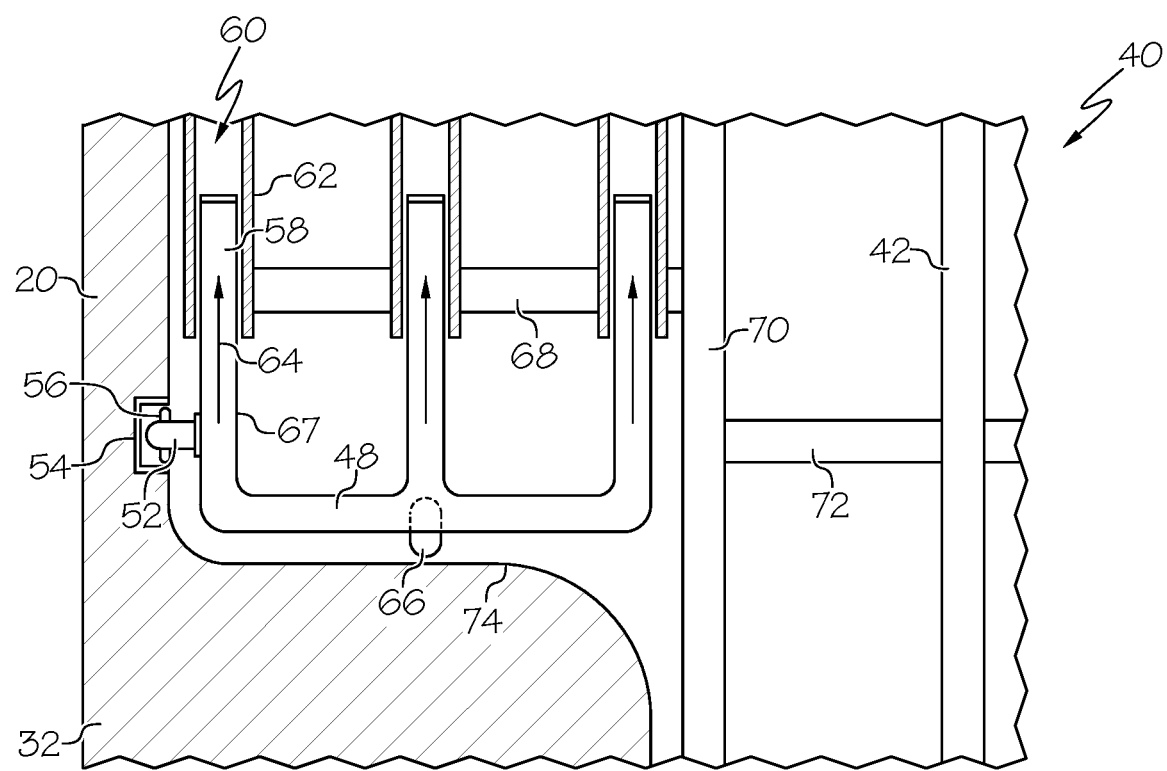
FIG. 2 diagrammatically depicts the bed divider of FIG. 1 with a divider extension in a retracted configuration, according to one or more embodiments shown and described herein.

Referring to FIG. 2, the divider extensions 48 and 50 each include a projection 52 that is received by respective guide channels 54. While only divider extension 48 and guide channel 54 associated with the sidewall 20 is shown in FIG. 2, the other sidewall 22 and divider extension 50 may include the same or similar features. The guide channels 54 extend along the sidewalls 20 and 22 and up and down over the wheel wells 32 and 34 of the truck bed 14 in order to move the divider extensions 48 and 50 between the extended configuration and the retracted configuration. The guide channels 54 extend up to place the divider extensions 48 and 50 in the retracted configuration and then down to place the divider extensions 48 and 50 in the extended configuration while the main body 42 remains fixed in the vehicle vertical direction. In the retracted configuration, the divider extensions 48 and 50 provide increased clearance for the wheel wells 32 and 34 relative to the extended configuration as the bed divider 40 is moved in the vehicle longitudinal direction along the truck bed 14.

FIG. 2 illustrates a detail view of the divider extension 48 including the projection 52 with a portion of the main body 42 shown in section. The main body 42 includes outboard vertical support rods 62 that each include openings 60 extending therethrough and inboard support rods 70. Horizontal support rods 68 and 72 extend between the vertical support rods 62. The openings 60 of the support rods 62 are sized to slidably receive portions 58 of the extension rods 67 of the divider extensions 48 and 50. As represented by arrow 64, the extension rods 58 telescope into and out of the support rods 62 as the divider extensions 48 and 50 move between the retracted and extended configurations.

The projections 52 are received within the guide channels 54 providing a guide surface also represented by element 54. While the guide channels 54 are shown as being C-shaped, they may have any suitable cross-section, such as L-shaped. In some embodiments, the projections 52 may be attached to wheels 56 that ride along the guide channels 54. For example, the wheels 56 may rotate to facilitate sliding of the bed divider 40 in the vehicle longitudinal direction. In some embodiments, the divider extensions 48 and 50 may include another wheel 66 that is rotatably connected to one of the support rods 68 of the divider extensions 48 and 50. The wheel 66 may ride along an upper surface 74 of the wheel wells 32 and 34 and the bed deck 18.

Referring again to FIG. 1, in some embodiments, the sidewalls 20 and 22 may further include a support channel 53 that extends in the vehicle longitudinal direction. The main body 42 may include a follower element 55 that extends outward from the main body 42 and is received within the support channel 53. Both sidewalls 20 and 22 may include the support channel 53 that receives respective follower elements 55.

Figure 3:
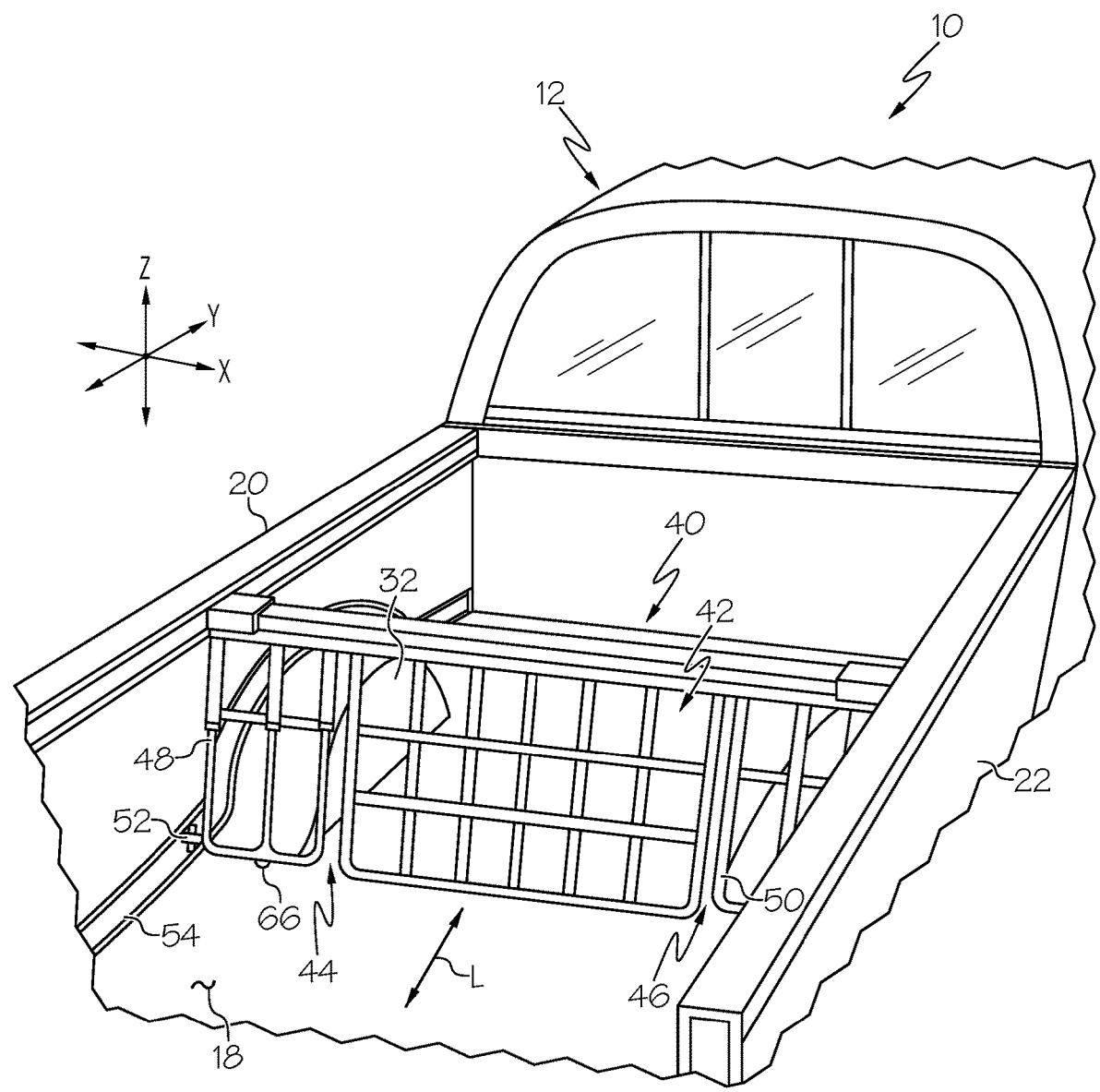
FIG. 3 diagrammatically depicts the bed divider of FIG. 2 with the divider extension in an extended configuration, according to one or more embodiments shown and described herein.

FIGS. 1 and 3 illustrate operation of the bed divider 40 as the bed divider 40 is slid in the vehicle longitudinal direction, represented by arrow L in FIG. 3. As the bed divider 40 is moved along the bed deck 18 toward the wheel wells 32 and 34, the projections 52 of the divider extensions 48 and 50 move along the guide channels 54 and then up and over the wheel wells 32 and 34, retracting the extension rods 67 into the support rods 62 and exposing the wheel well openings 44 and 46 as represented by FIG. 1. As the bed divider 40 is moved along the bed deck 18 away from the wheel wells 32 and 34, the projections 52 of the divider extensions 48 and 50 move along the channels 54 and then down and around the wheel wells 32 and 34, extending extension rods 67 out of the support rods 62 and covering the wheel well openings 44 and 46.

The above-described bed dividers and bed divider systems include divider extensions that both cover and expose wheel well opening automatically in that there is no need to manually move the divider extensions relative to the main body. Instead, the guide channels that extend along the sidewalls of the truck bed provide guide elements that the projections of the divider extensions move along, which cause the divider extensions to move between their extended and retracted configurations as the main body of the divider extension is moved. In some embodiments, bed divider systems are provided with another support channel that is used to support the main body in the vehicle vertical direction while the divider extension move relative to the main body.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A truck comprising:
   a passenger cabin;
   a truck bed located rearward of the passenger cabin in a vehicle longitudinal direction, the truck bed includes a bed deck, a first sidewall, a second sidewall, a first wheel well adjacent the first sidewall and a second wheel well adjacent the second sidewall; and a bed divider extends in a vehicle lateral direction, the bed divider comprising:
- a main body that has a wheel well opening that is sized and arranged to receive the first wheel well therethrough; and
- a divider extension that is moveable relative to the main body and that covers the wheel well opening in an extended configuration, the divider extension includes a projection that rides along a guide that extends along the first sidewall and over the first wheel well of the truck bed in order to move the divider extension between the extended configuration and a retracted configuration providing increased clearance for the first wheel well relative to the extended configuration as the bed divider is moved in the vehicle longitudinal direction along the truck bed;

wherein the main body comprises a vertically extending support rod that includes an opening extending therethrough that is sized and configured to slidably receive an extension rod of the divider extension.

2. The truck of claim 1, wherein the divider extension is a first divider extension and the wheel well opening is a first wheel well opening, the main body further comprising a second wheel well opening that is sized and arranged to receive the second wheel well therethrough.

3. The truck of claim 2, wherein the bed divider comprising a second divider extension that is moveable relative to the main body and covers the second wheel well opening in an extended configuration.

4. The truck of claim 1, wherein the divider extension comprises a wheel that is rotatably connected to the projection and that rides along the guide.

5. The truck of claim 1, wherein the divider extension comprises a wheel rotatably connected thereto that is arranged and configured to ride along an upper support surface of the first wheel well.

6. A bed divider system for a truck bed, the bed divider system comprising:
a bed divider comprising:
- a main body that has a wheel well opening that is sized and arranged to receive a wheel well therethrough; and
- a divider extension that is moveable relative to the main body and covers the wheel well opening in an extended configuration, the divider extension includes a projection arranged and configured to ride along a guide; and
- a guide configured to extend along a first sidewall of the truck bed and over the wheel well in order to move the divider extension between the extended configuration and a retracted configuration providing increased clearance for the wheel well relative to the extended configuration as the bed divider is moved in a vehicle longitudinal direction along the truck bed;

wherein the main body comprises a vertically extending support rod that includes an opening extending therethrough that is sized and configured to slidably receive an extension rod of the divider extension.

7. The bed divider system of claim 6, wherein the divider extension is a first divider extension and the wheel well opening is a first wheel well opening, the main body further comprising a second wheel well opening that is sized and arranged to receive a second wheel well therethrough.

8. The bed divider system of claim 7, wherein the bed divider comprising a second divider extension that is moveable relative to the main body and covers the second wheel well opening in an extended configuration.

9. The bed divider system of claim 6, wherein the divider extension comprises a wheel that is rotatably connected to the projection and that rides along the guide.

10. The bed divider system of claim 9, wherein the guide comprises a guide channel that receives the wheel.

11. The bed divider system of claim 6, wherein the divider extension comprises a wheel rotatably connected thereto that is arranged and configured to ride along an upper support surface of the wheel well.

12. A bed divider system for a truck bed, the bed divider system comprising:
a bed divider comprising:
- a main body that has a wheel well opening that is sized and arranged to receive a wheel well therethrough; and
- a divider extension that is moveable relative to the main body and covers the wheel well opening in an extended configuration, the divider extension includes a projection arranged and configured to ride along a guide; and
- a guide configured to extend along a first sidewall of the truck bed and over the wheel well in order to move the divider extension between the extended configuration and a retracted configuration providing increased clearance for the wheel well relative to the extended configuration as the bed divider is moved in a vehicle longitudinal direction along the truck bed;

wherein the divider extension comprises a wheel that is rotatably connected to the projection and that rides along the guide;

wherein the guide comprises a guide channel that receives the wheel.

13. The bed divider system of claim 12, wherein the divider extension is a first divider extension and the wheel well opening is a first wheel well opening, the main body further comprising a second wheel well opening that is sized and arranged to receive a second wheel well therethrough.

14. The bed divider system of claim 13, wherein the bed divider comprising a second divider extension that is moveable relative to the main body and covers the second wheel well opening in an extended configuration.

* * * * *